United States Patent
Nemeth et al.

(10) Patent No.: US 11,422,759 B1
(45) Date of Patent: Aug. 23, 2022

(54) PAGE ALIGNMENT FOR TRACTORLESS PAPER

(71) Applicants: Rose Nemeth, Boulder, CO (US); Kenneth Stuart Shouldice, Firestone, CO (US); John F. Meixel, Longmont, CO (US)

(72) Inventors: Rose Nemeth, Boulder, CO (US); Kenneth Stuart Shouldice, Firestone, CO (US); John F. Meixel, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 29 days.

(21) Appl. No.: 17/183,767

(22) Filed: Feb. 24, 2021

(51) Int. Cl.
*G06F 3/12* (2006.01)
*G06K 15/02* (2006.01)

(52) U.S. Cl.
CPC .......... *G06F 3/1251* (2013.01); *G06F 3/1208* (2013.01); *G06F 3/1243* (2013.01); *G06K 15/022* (2013.01); *G06K 15/1832* (2013.01); *G06K 15/1885* (2013.01)

(58) Field of Classification Search
CPC .... G06F 3/1251; G06F 3/1208; G06F 3/1243; G06K 15/022; G06K 15/1832; G06K 15/1885
See application file for complete search history.

(56) References Cited

U.S. PATENT DOCUMENTS

| | | | |
|---|---|---|---|
| 5,768,488 A | 6/1998 | Stone et al. | |
| 6,631,007 B1 | 10/2003 | Buis et al. | |
| 7,177,045 B2 | 2/2007 | Goel et al. | |
| 8,050,587 B2 | 11/2011 | Kurihara | |
| 8,248,652 B2 | 8/2012 | Wardell et al. | |
| 8,456,690 B2 | 6/2013 | Morales et al. | |
| 8,693,059 B2 | 4/2014 | Boyes et al. | |
| 10,032,095 B2 | 7/2018 | Muthupandi et al. | |
| 2007/0070374 A1* | 3/2007 | Boyes, Jr. | G06F 3/125 358/1.13 |
| 2007/0076234 A1* | 4/2007 | Hopper | H04N 1/0032 358/1.12 |
| 2016/0307076 A1* | 10/2016 | Muthupandi | G06K 15/1868 |
| 2020/0114668 A1* | 4/2020 | Havive | B41J 3/60 |
| 2021/0241053 A1* | 8/2021 | Takahashi | B41J 2/01 |

FOREIGN PATENT DOCUMENTS

JP    5188586 B2    4/2013

* cited by examiner

*Primary Examiner* — Iriana Cruz
(74) *Attorney, Agent, or Firm* — Duft & Bornsen, PC (57) ABSTRACT

System and methods for page alignment for tractorless paper. In one embodiment, an apparatus receives a print job to be printed on a continuous web of print media in a duplex format with multiple first pages across a front of the web and multiple second pages across a back of the web which correspond with the multiple first pages. The apparatus maps pages to sheetlet regions, and applies first offsets to the sheetlet regions on the front of the virtual continuous forms based on operator input. The controller also determines second offsets for the sheetlet regions on the back of the virtual continuous forms based on an additive inverse of the first offsets, and modifies processing of the print job by applying the second offsets to the sheetlet region on the back of the virtual continuous forms to maintain alignment of front pages and back pages across the web.

20 Claims, 9 Drawing Sheets

PAGE ALIGNMENT FOR TRACTORLESS PAPER

FIELD OF THE INVENTION

The invention relates to the field of printing systems, and in particular, to page alignment of print jobs.

BACKGROUND

A high-speed printer may include functionality to print multiple pages across the width of a continuous-form web, which is commonly referred to as N-up printing. In addition to N-up printing, a printer may be equipped with a so-called cut-sheet emulation (CSE) mode in which the web is logically divided in half to emulate printing on two separate sheets of cut-sheet output. Print jobs using an N-up format or CSE mode have traditionally printed on 18 by 11 inch tractored paper. The tractor strips were 0.5 inch margins that tear off from the sides, and as such the printable area was 17 by 11 inches. Therefore, 8.5 by 11 inch pages would fit exactly into the printable area, and the pages lined up front-to-back for cutting or folding. However, if a user wishes to use 18 by 11 inch paper without tractor strips, the printable area is comparatively increased to 18 by 11 inches, causing N-up commands and CSE functions to position the pages such that they do not line up front-to-back, causing issues with cutting or folding the paper web.

SUMMARY

Embodiments described herein provide for page alignment for tractorless paper. The processing of print jobs which use N-up formatting or cut-sheet emulation (CSE) mode is modified such that pages align front-to-back in situations in which the paper size is larger than the intended layout. For example, in a case of using tractorless paper, the printable area is 18 by 11 inches even though the intended layout of the print job is 17 by 11 inches. By determining offsets for pages on the front, and applying an inverse of the offsets to pages on the back, the print job processing is modified to desirably print with the pages in alignment front-to-back.

One embodiment is an apparatus that includes a host interface configured to receive a print job to be printed on a continuous web of print media in a duplex format with multiple first pages across a front of the web and multiple second pages across a back of the web which correspond with the multiple first pages. The apparatus also includes an imposition controller configured to determine a print region of the print job with respect to a virtual continuous forms representing a size of the web, to determine a size of sheetlet regions for the print region, to map the multiple first pages to the sheetlet regions on a front of the virtual continuous forms, and to map the multiple second pages to the sheetlet regions on a back of the virtual continuous forms. The imposition controller is also configured to apply first offsets to the sheetlet regions on the front of the virtual continuous forms based on operator input, to determine second offsets for the sheetlet regions on the back of the virtual continuous forms based on an additive inverse of the first offsets, and to modify the processing of print job by applying the second offsets to the sheetlet region on the back of the virtual continuous forms to maintain alignment of front pages and back pages across the web.

The above summary provides a basic understanding of some aspects of the specification. This summary is not an extensive overview of the specification. It is not intended to identify key or critical elements of the specification nor to delineate any scope of particular embodiments of the specification, or any scope of the claims. Its sole purpose is to present some concepts of the specification in a simplified form as a prelude to the more detailed description that is presented later. Other example embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1A:
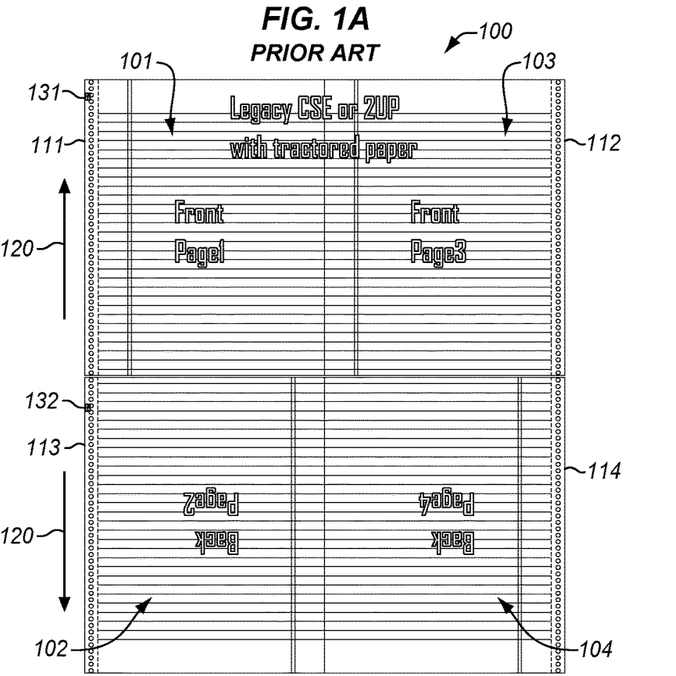
FIG. 1A illustrates printed output on tractored paper with an N-up or CSE job in the prior art.

FIG. 1A illustrates printed output on tractored paper 100 with an N-up or CSE job in the prior art. Suppose, for example, that a print job using an N-up format or CSE mode has printed on the tractored paper 100 dimensioned 18 by 11 inches. The tractored paper 100 includes margins 111-114 (e.g., 0.5 inch margins) that tear off from the sides. Accordingly, the printable area of the tractored paper 100 is 17 by 11 inches, and 8.5 by 11 inch pages fit exactly into the printable area such that the logical pages 101-104 line up front-to-back for cutting or folding. In this example, the tractored paper 100 is printed with a first page 101 on the front, a second page 102 on the back of the first page 101, a third page 103 to the side of the first page 101 on the front, and a fourth page 104 on the back of the third page 103. Additionally, the printer may apply verification marks 131-132 to one or more margins 111-114 to verify print characteristics.

Figure 1B:
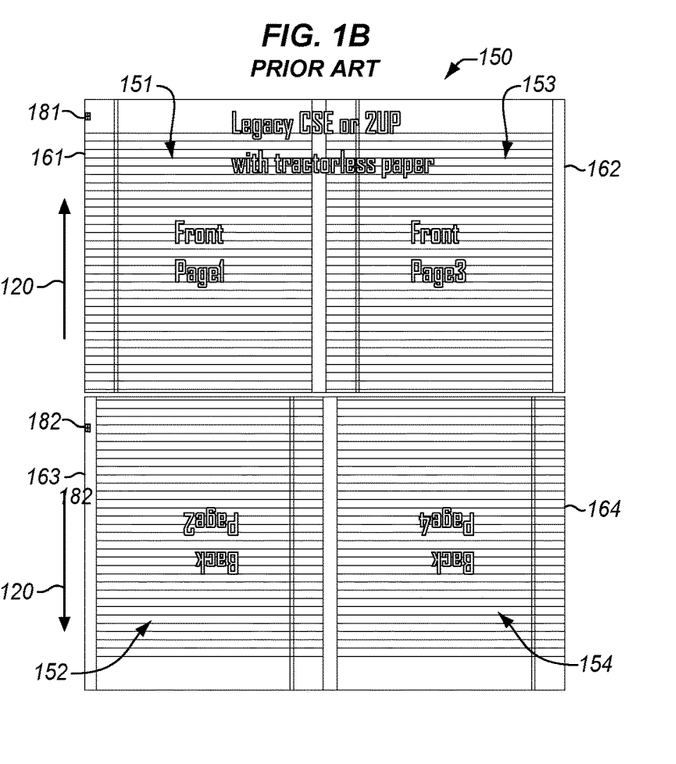
FIG. 1B illustrates printed output on tractorless paper with an N-up or CSE job in the prior art.

FIG. 1B illustrates printed output on tractorless paper 150 with an N-up or CSE job in the prior art. Suppose, in this example, that a print operator would like a print job with an N-up format or CSE mode to print on tractorless paper 150 dimensioned 18 by 11 inches. Since the sides 161-164 do not tear away, the printable area is now 18 by 11 inches instead of 17 by 11 inches. Therefore, the pages 151-154 are spread out too much on the side because the paper size (e.g., width of the print media in printer) is larger than the intended page layout size (e.g., the page width size that the print job was created for). Furthermore, the pages 151-154 collide with the verification marks 181-182 (e.g., the verification mark 181 is undesirably within the printable area of the first page 151). Moreover, the pages 151-154 do not line up front-to-back and therefore cannot be easily cut or folded together.

FIGS. 1A-B diagrammatically show front sides right side up, and back sides upside down as if the paper were peeled apart to separate the front from the back. This is intended to show how the fronts and backs physically line up. Accordingly, arrows 120 indicate a direction of the printing process from the point of view of the sides as the web of paper progresses through a print engine. In high-speed, continuous forms printing systems, it is common to print duplex or two-sided print jobs using a second print engine. The continuous forms paper is flipped for printing on the back side of the paper with the second print engine. Thus, back sides of the sheet are shown with the arrow 120 pointing downward to represent the process direction.

Figure 2:
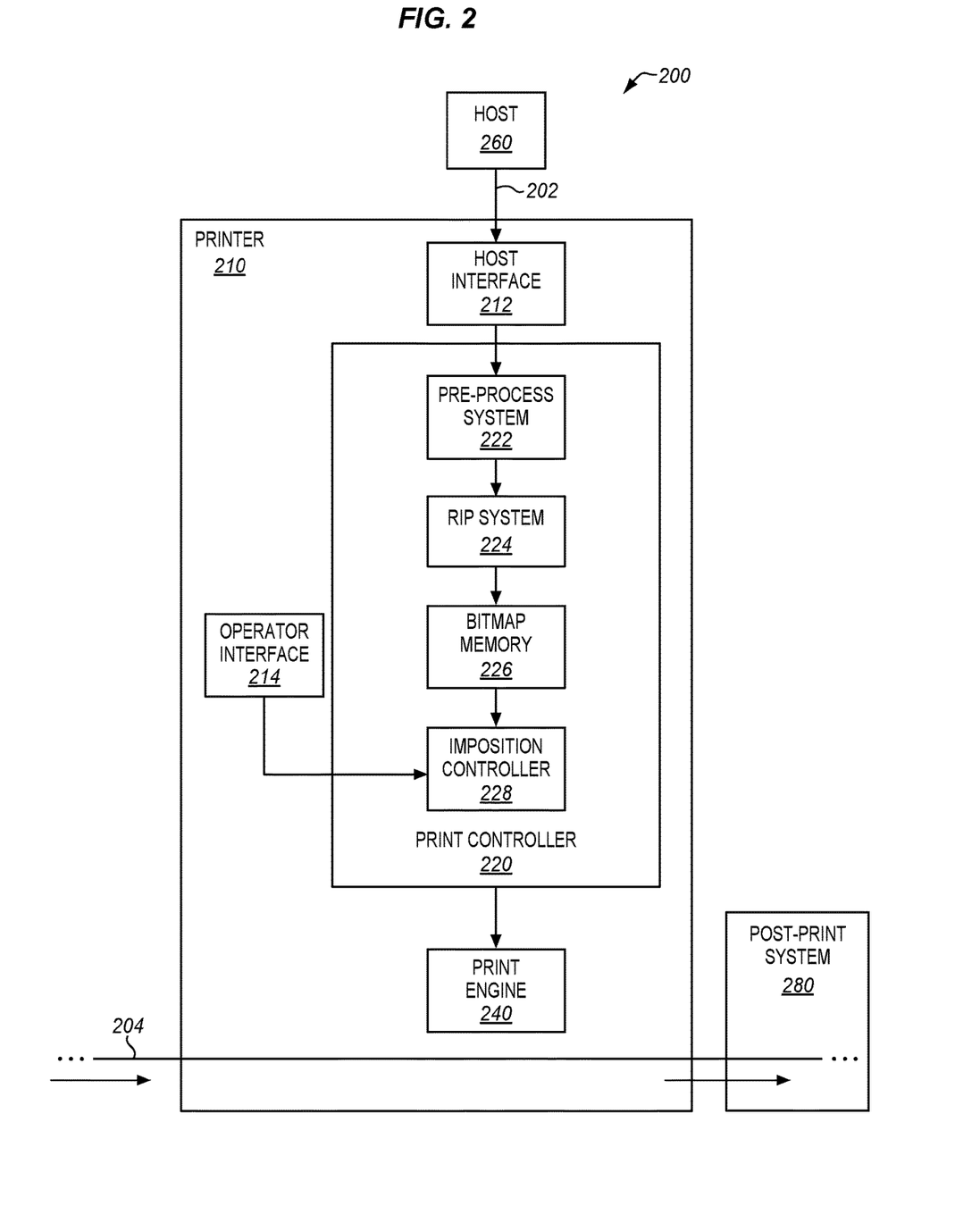
FIG. 2 is a block diagram of a printing system in an illustrative embodiment.

FIG. 2 is a block diagram of a printing system 200 in an illustrative embodiment. The printing system 200 includes a printer 210, a host 260, and a post-print system 280. The printer 210 is enhanced with an imposition controller 228 configured to modify the processing of N-up or cut-sheet emulation (CSE) jobs to automatically align pages front-to-back despite a change in size of paper or printable area. This gives the print operator the ability to run jobs on paper that is larger than intended for the job, and still retain the intended layout without manually determining and changing the processing of the job.

The printer 210 includes a host interface 212 for receiving raw print jobs 202 from one or more host systems 260. The printer 210 further includes a print controller 220 to perform various processing operations on the print jobs before submitting it to one or more print engines 240 that marks a web of print media 204. Alternatively or in addition to submitting to one or more print engines 240, the processed print job may be submitted for display (e.g., print preview). After printing, the web of print media 204 continues to a post-print system 280 that may comprise any number of post-print devices for processing pages printed on the web of print media 204, such as a cutter, folder, inserter, etc.

The print controller 220 includes a pre-process system 222, a Raster Image Processor (RIP) system 224, bitmap memory 226, and an imposition controller 228. The pre-process system 222 receives raw data for print jobs, and perform pre-processing on the raw data before the print jobs are interpreted, such as segmenting the print jobs into pages. The pre-process system 222 may also store print jobs received from the host 260 in a raw job spool (not shown). The RIP system 224 interprets, assemble, renders, rasterizes, or otherwise converts raw sheet sides for print jobs into sheet side bitmaps for the print jobs. The bitmap memory 226 may temporarily store the sheet side bitmaps prior to modification by the imposition controller 228.

The imposition controller 228 implements an improvement on N-up or CSE print jobs. In particular, the imposition controller 228 provides a convenient way for a print operator to center and align front/back pages printed in duplex even in situations where the paper size is changed to be larger than the intended page layout size of the print job. The printer 210 may include an operator interface 214 to receive user input or parameters which apply a change in printable area. For example, the parameters may include a size of the total CSE or N-up layout. The imposition controller 228 uses the parameters to calculate offsets for the CSE or N-up layout that automatically align pages of the print job front-to-back.

The printing system 200 is generally capable of printing and handling N-up jobs and CSE jobs. In N-up, multiple (i.e., "N") logical pages are printed on one or both surfaces of a physical sheet. For example, in printing duplex (e.g., on both sides of each sheet of paper) in a 2-up format, the printer 200 arranges two logical pages on each sheet side. In addition to N-up printing, the printer 200 may process and print CSE print jobs in which the web is logically divided in half to emulate printing on two separate sheets of cut-sheet output. CSE uses similar commands to arrange multiple logical pages on each sheet side. As will be described in greater detail below, the imposition controller 228 may advantageously calculate and apply offsets for logical pages in the bitmap memory 226 to automatically align pages front-to-back for an N-up or CSE print job printed on the web of print media 204 despite a change in size of paper or printable area.

Figure 3:
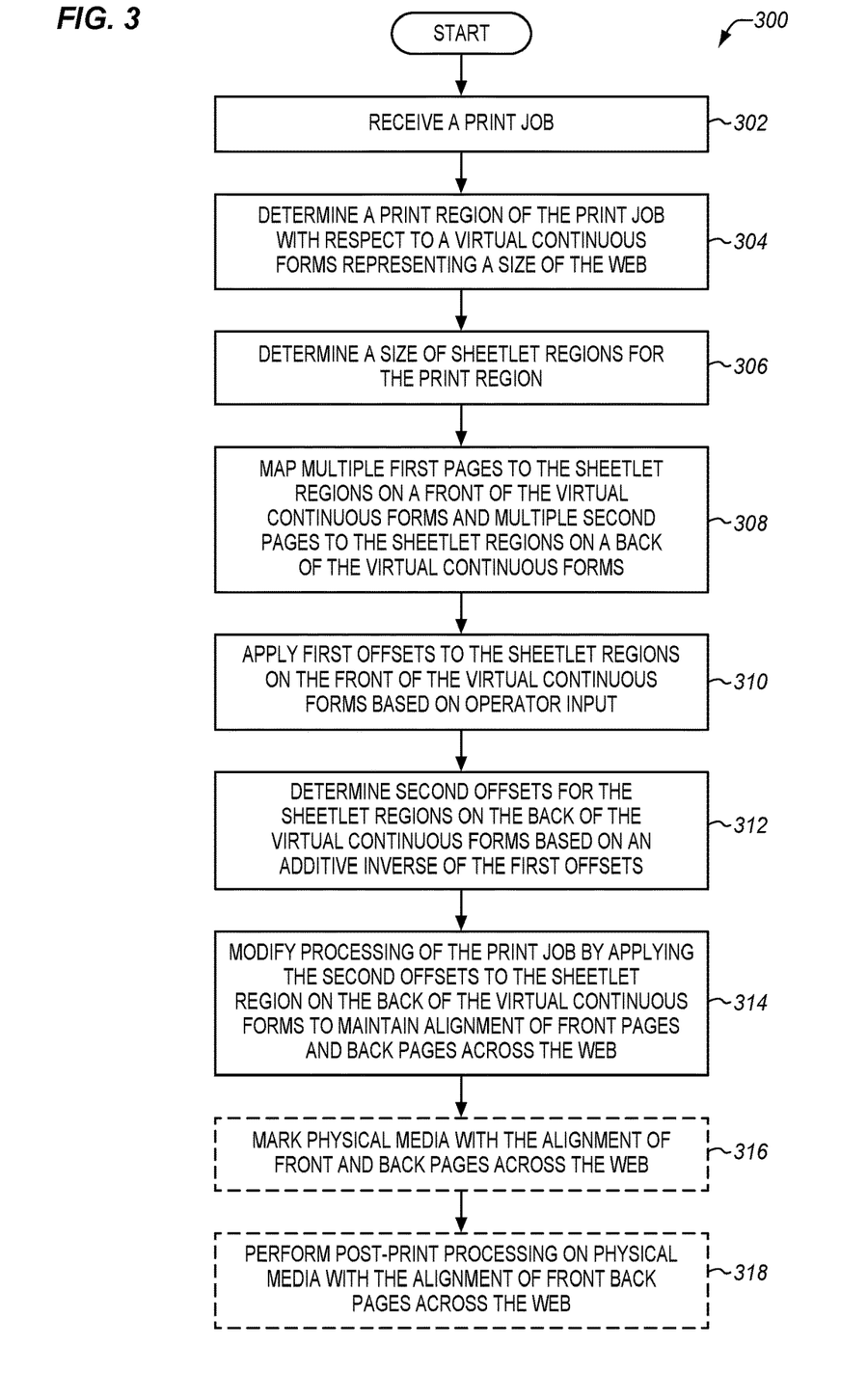
FIG. 3 is a flow chart illustrating a method for aligning multiple pages front-to-back for printing in an illustrative embodiment.

FIG. 3 is a flow chart illustrating a method 300 for aligning multiple pages front-to-back for printing in an illustrative embodiment. The steps of the method 300 will be described with respect to the printing system 200 of FIG. 2, although one skilled in the art will understand that method 300 may be performed by other systems not shown. The steps of the methods described herein are not all inclusive, may include other steps not shown, and may be performed in an alternative order.

At step 302, the print controller 220 receives a print job via the host interface 212. The print job may be accompanied with an associated job ticket that defines metadata for the print job, such as media information (e.g., size, type, color, weight), the number of logical pages on a sheet side (e.g., N-up printing configuration), plex (e.g., simplex or duplex), insert pages, page exceptions, etc. Additionally, some media information may be determined/collected by preprocess system 222 during segmentation/pagination of print data, such as a media size to be used if the job ticket does not specify or is overruled in settings of the print controller 220. Assume, for this embodiment, that the print job to be printed on a continuous web of print media in a duplex format with multiple first pages across a front of the web and multiple second pages across a back of the web which correspond with the multiple first pages. Further assume, for this embodiment, that the print job includes an N-up or CSE print job that has been pre-processed, rasterized, and stored in the bitmap memory 226.

At step 304, the imposition controller 228 determines a print region of the print job with respect to a virtual continuous forms representing a size of the web. At step 306, the imposition controller 228 determines a size of sheetlet regions for the print region. At step 308, the imposition controller 228 maps the multiple first pages to the sheetlet regions on a front of the virtual continuous forms, and maps the multiple second pages to the sheetlet regions on a back of the virtual continuous forms.

At step 310, the imposition controller 228 applies first offsets to the sheetlet regions on the front of the virtual continuous forms based on operator input. At step 312, the imposition controller 228 determines second offsets for the sheetlet regions on the back of the virtual continuous forms based on an additive inverse of the first offsets. In one embodiment, the first offsets comprise offsets for each of the left and right front sheetlet regions (e.g., sheetlet regions corresponding to first page 601 and third page 603) and the second offsets comprise offsets for each of the left and right back sheetlet regions (e.g., sheetlet regions corresponding to second page 602 and fourth page 604). At step 314, the imposition controller 228 modifies processing of the print job by applying the second offsets to the sheetlet region on the back of the virtual continuous forms to maintain alignment of front pages and back pages across the web.

At optional step 316, the print engines 240 mark physical media (e.g., web of print media 204) with the alignment of front pages and back pages across the web. At optional step 318, the post-print system 280 performs post-print processing on the physical media with the alignment of front pages and back pages across the web. Accordingly, in method 300, the processing of an N-up or CSE print job is automatically modified to print pages in alignment front-to-back even in situations in which the actual paper size is larger than the intended layout size.

Figure 4:
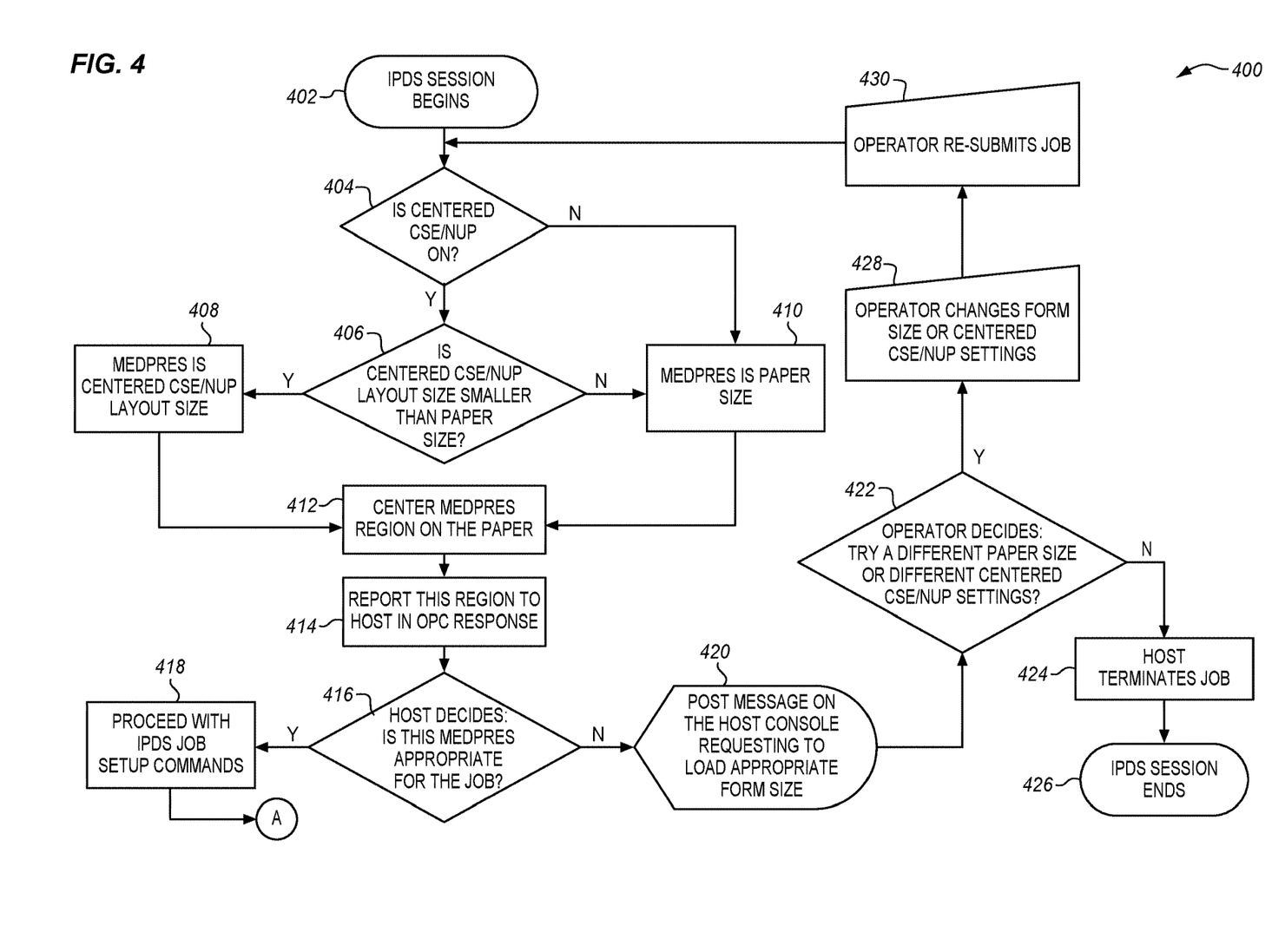
FIG. 4 is a flow chart illustrating a method for aligning multiple pages front-to-back for printing in another illustrative embodiment.
Figure 5:
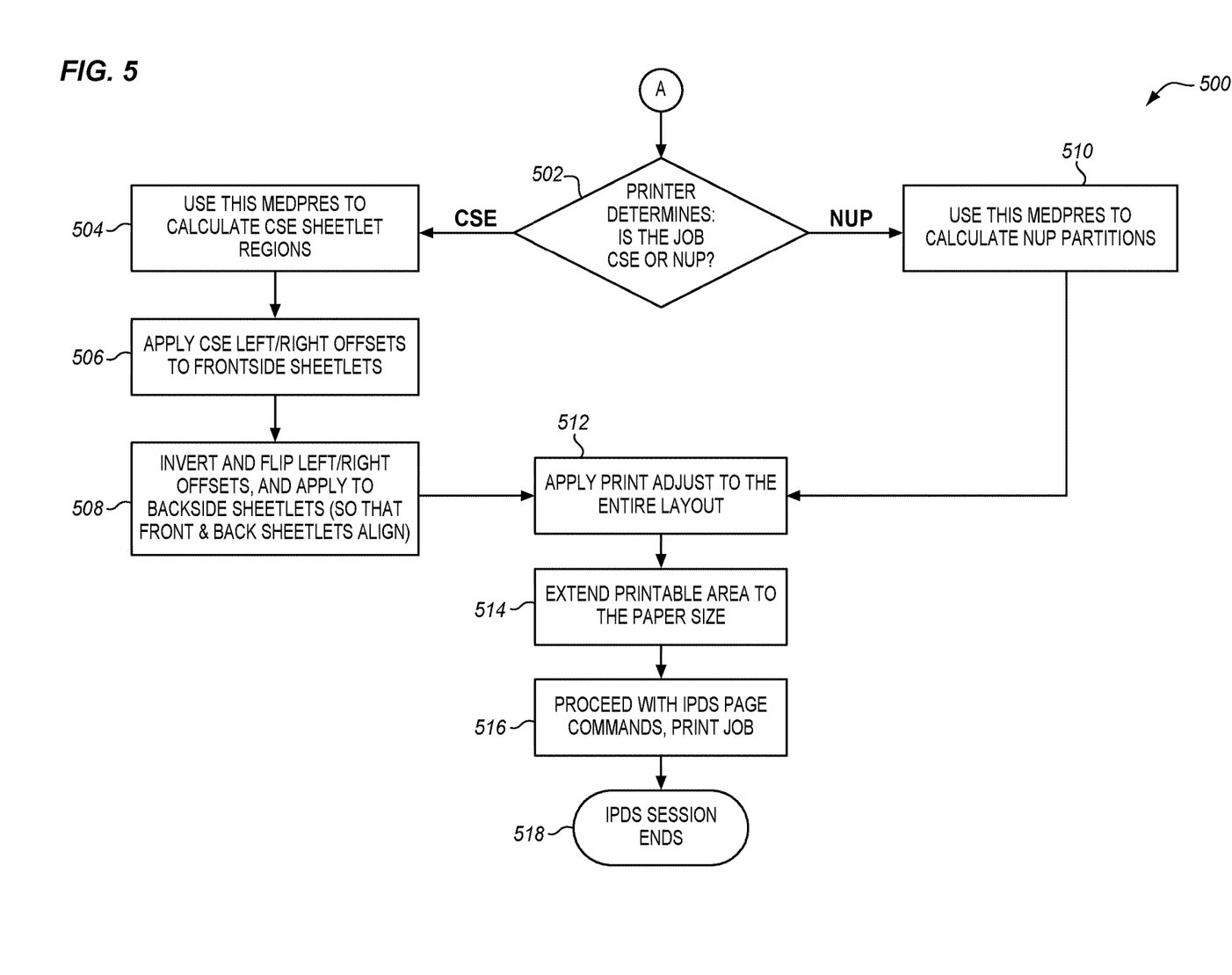
FIG. 5 is a flow chart illustrating a further method continuing the steps of FIG. 4 for aligning multiple pages front-to-back for printing in another illustrative embodiment.

FIG. 4 is a flow chart illustrating a method 400 for aligning multiple pages front-to-back for printing in another illustrative embodiment. FIG. 5 is a flow chart illustrating a further method 500 continuing the steps of FIG. 4 for aligning multiple pages front-to-back for printing in another illustrative embodiment. The steps of methods 400/500 will be described with respect to the printing system 200 of FIG. 2, although one skilled in the art will understand that method 400/500 may be performed by other systems not shown.

Assume, for this embodiment, that a received print job is encoded using a page description language defined by the Intelligent Printer Data Stream (IPDS). IPDS supports commands for the presentation of pages with combinations of various data types including text, vector graphics, and images. IPDS also supports two-way printer communication that enables detailed exception reporting and adaption to errors in real time.

In step 402, an IPDS session begins. In step 404, the print controller 220 determines whether a centered CSE/N-up function is on. The centered CSE/N-up function is a new configuration setting of the print controller 220 that may be toggled on/off by a print operator. If toggled on, the method 400 proceeds to step 406, and the print controller 220 determines whether the centered CSE/N-up size is smaller than the paper size. If so, (yes in step 406) the method 400 proceeds to step 408, and the print controller 220 sets the Media Presentation Space as the centered CSE/N-up layout size. For N-up, the Media Presentation Space is the region used for N-up page partitioning and medium overlay placement. For CSE, the Media Presentation Space is the resulting sheetlet region after the media is divided in half which is used for CSE page and medium overlay placement. Otherwise, (no in step 406) the method 400 proceeds to step 410, and the print controller 220 sets the Media Presentation Space as the paper size.

In step 412, the print controller 220 centers the Media Presentation Space region on the paper. Accordingly, in steps 406-412, the print controller 220 calculates the smaller of centered CSE/N-up size and paper size, and centers this region and makes it the Media Presentation Space. The centered CSE-N-up size (e.g., width and length) is the size of the total CSE or N-up layout. The centered CSE-N-up size, like the centered CSE/N-up toggle function, may be a new configuration setting of the print controller 220 which the operator inputs via the operator interface 214. The operator-specified CSE/N-up size is centered on the paper, which by definition makes the front and back medium presentation spaces physically aligned.

In step 414, the print controller 220 reports the centered Media Presentation Space region to the host 260 in an Obtain Print Characteristics (OPC) response. In step 416, the host 260 determines whether the Media Presentation Space is appropriate for the print job. If not, in step 420, the host 260 may post a message requesting to load an appropriate form size, and in step 422 that operator may decide whether to try a different paper size or different centered CSE/N-up settings. Thus, the operator may, in step 428, enter changes to the form size or centered CSE/N-up size via the operator interface 214, and in step 430 resubmit the print job where the method returns to step 404. Otherwise, if the operator does not change settings, the host 260 may terminate the job in step 424 and the IPDS session ends in step 426. If, in step 416, the host 260 determines that the Media Presentation Space is appropriate for the print job, the print controller 220 proceeds with the IPDS job setup commands in step 418. This is discussed in more detail with respect to FIG. 5.

In step 502, the print controller 220 determines whether the print job is CSE or N-up. If the print job is CSE, the method 500 proceeds to step 504 and the print controller 220 uses the CSE Media Presentation Space which is the resulting sheetlet region after the media is divided in half In step 506, the print controller 220 applies CSE left and right offsets to the frontside sheets. CSE left and right offset values may be received from operator interface 214 according to operator input. Then, in step 508, the print controller 220 inverts and flips the left/right offsets, and applies the result to the backside sheetlets so that the front and back sheetlets align. Otherwise, if the print job is N-up, the method 500 proceeds to step 510 and the print controller 220 uses the N-up Media Presentation Space which is the region used for N-up page partitioning.

In step 512, the print controller 220 applies print adjust to the entire layout. In step 514, the print controller 220 extends the printable area to the paper size. Print adjust values may be received from operator interface 214 according to operator input. Thus, for N-up jobs, the centered N-up size is used for N-up partitioning, but the entire paper is allowed as the Valid Printable Area (VPA). The VPA is the area in which the user data is allowed to print, with any data outside the area being clipped. Pages that go outside the N-up partition are printed out to the paper edge. Additionally, print adjust can be used to move the entire layout in any direction, and data may not be clipped until it reaches the paper edge. Similarly, for CSE jobs, the centered CSE size is used to calculate the CSE sheetlet sizes, and the VPA may be extended to the original paper size. CSE left and right offsets can be used to move the cutting line, or increase or decrease the gutter space between CSE sheetlets. In any case, the sheetlets still align front-to-back and CSE page data is not clipped until it reaches the paper edge.

In step 516, the print controller 220 proceeds with IPDS page commands to process and print the print job. Then, in step 518, the IPDS session ends. Accordingly, using methods 400/500, a print operator has the ability to run jobs on paper that is larger than intended for either a CSE or N-up print job, and still retain the intended layout. The method 400/500 advantageously use a combination of centered CSE/N-up total layout size, CSE left and right offsets, and print adjust to produce a layout size configured by the operator, and also align the layout front-to-back. This solves misalignment issues for CSE/N-up jobs while avoiding the need for a customer to manually determine and change their print job processing.

Figure 6:
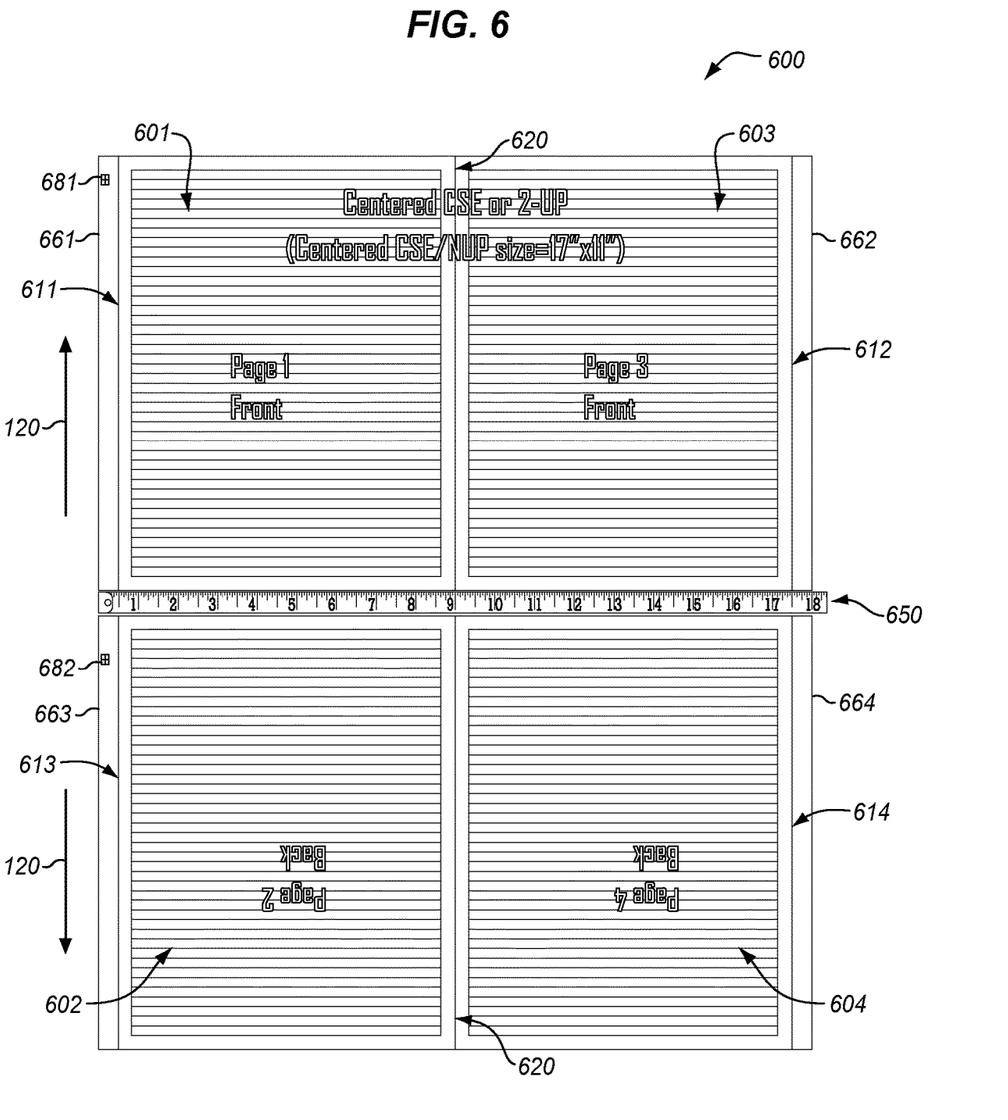
FIG. 6 illustrates printed output on tractorless paper with an N-up or CSE job in an illustrative embodiment.

FIG. 6 illustrates printed output on tractorless paper 600 with an N-up or CSE job in an illustrative embodiment. Suppose, in this example, that a print operator would like to print a print job in a 2-up format or CSE mode on tractorless paper 600 dimensioned 18 by 11 inches. Since the sides 661-664 do not tear away, the printable area is now 18 by 11 inches instead of 17 by 11 inches. Accordingly, with the centered CSE/N-up function turned on, the Media Presentation Space becomes the centered CSE/N-up size, which in this case it is 17 by 11 inches. Therefore, the margins 611-614 are spaced a half inch from the sides 661-664, as shown by the reference ruler 650, and the verification marks 681-682 do not interfere with the printable area. Additionally, the front side (a first page 601 and third page 603) and the back side (e.g., a second page 602 and fourth page 604) have a center line 620 that is common to both sides and this common center line reference is the basis for aligning the sides as further described below.

Figure 7:
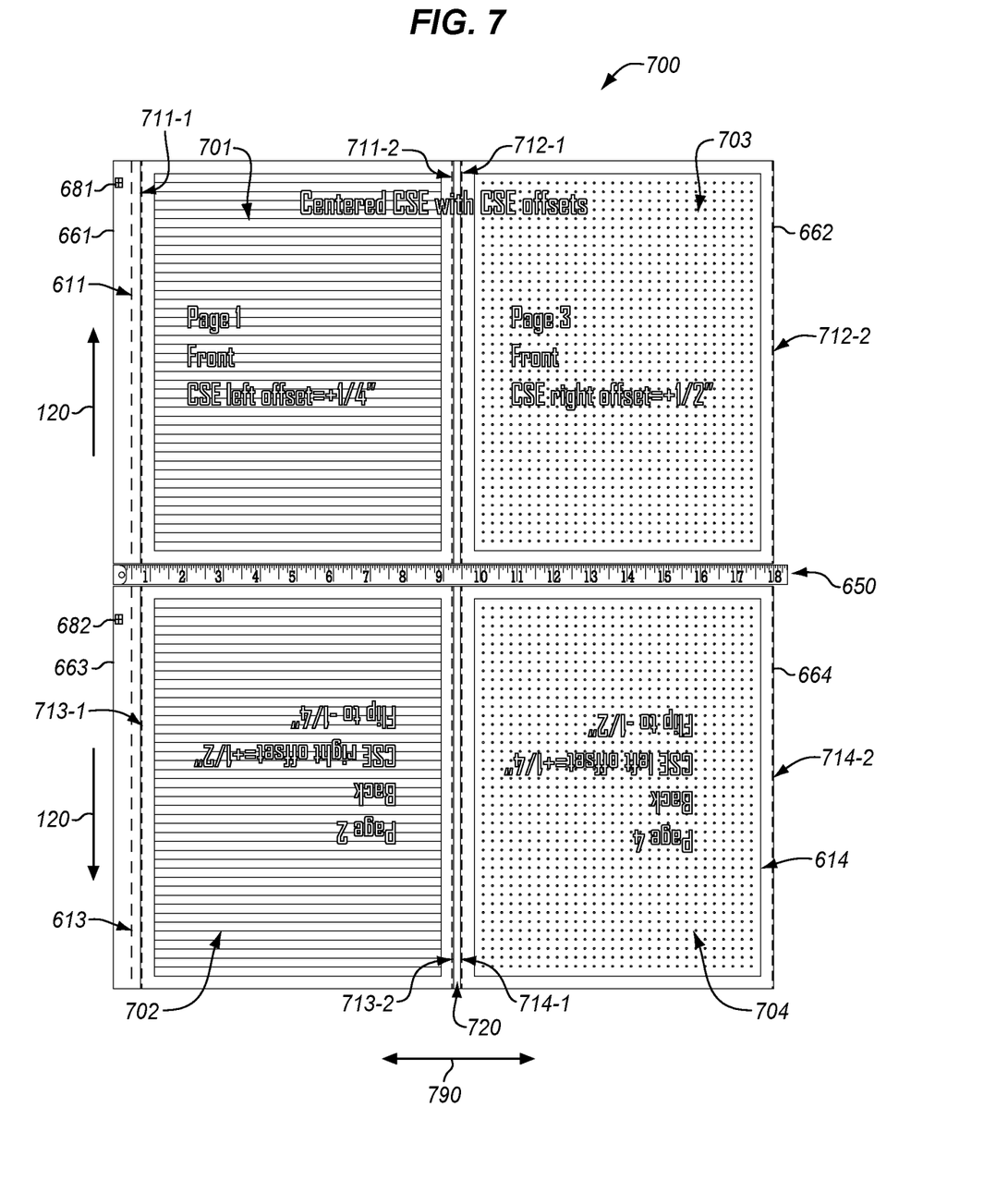
FIG. 7 illustrates printed output on tractorless paper with automatically applied offset to align front and back pages in an illustrative embodiment.

FIG. 7 illustrates printed output on tractorless paper 700 with automatically applied offset to align front and back pages in an illustrative embodiment. In this example, the centered CSE function combines with CSE left and right offsets to allow the print operator complete control over CSE page placement. FIG. 7 shows an example in which the print operator enters input to shift the sheetlets 701-704 (e.g., in a width direction 790) such that the cutting line is further to the right and the gutter space 720 between the sheetlets 701-704 is increased. In reference to a bitmap, the print controller 220 interprets a positive value as movement to the right and a negative value as movement to the left.

In this example, by entering the appropriate centered CSE size and offsets, the front side includes a first sheetlet 701 with a +¼" CSE left offset and a third sheetlet 703 with a +½" CSE right offset. That is, boundaries 711-1 and 711-2 of the first sheetlet 701 are shifted to the right ¼" relative to the printed output of FIG. 6 (see e.g., left margin 611). And, boundaries 712-1 and 712-2 are shifted to the right ½" taking into account a ¼" of the gutter space 720 between left/right sheetlets. Previously, without print controller 220 to automatically apply offsets as described herein, the second sheetlet 702 would include +½" CSE right offset, and the fourth sheetlet 704 would include a +¼" CSE left offset, resulting in front-to-back misalignment as previously described.

To maintain alignment between the front side and the back side, the print controller 220 inverts and flips the front side offsets and applies the result to the back side. Put another way, the left/right offsets are switched and negated, and the second offset is set to an additive inverse of the first offset for corresponding sides. Thus, in this example, the second sheetlet 702, which is on the back side of the first sheetlet 701, is assigned −¼" CSE right offset to maintain alignment (e.g., shifted to the right ¼" relative to left margin 613). Similarly, the fourth sheetlet 704, which is on the back side of the third sheetlet 703, is assigned a −½" CSE left offset to maintain alignment. Thus, boundaries 713-1 and 713-2 at the back side align with boundaries 711-1 and 711-2 at the front side, and boundaries 714-1 and 714-2 at the back side align with boundaries 712-1 and 712-2 at the front side, allowing the tractorless paper 700 to be easily cut or folded despite the paper layout change.

FIGS. 6-7 show front sides right side up, and back sides upside down as if the paper were peeled apart to separate the front from the back. This is intended to show how the fronts and backs physically line up. Accordingly, arrows 120 indicate a direction of the printing process from the point of view of the sides as the web of paper progresses through a print engine. Thus, back sides of the sheet are shown with the arrow 120 pointing downward to represent the process direction.

Figure 8:
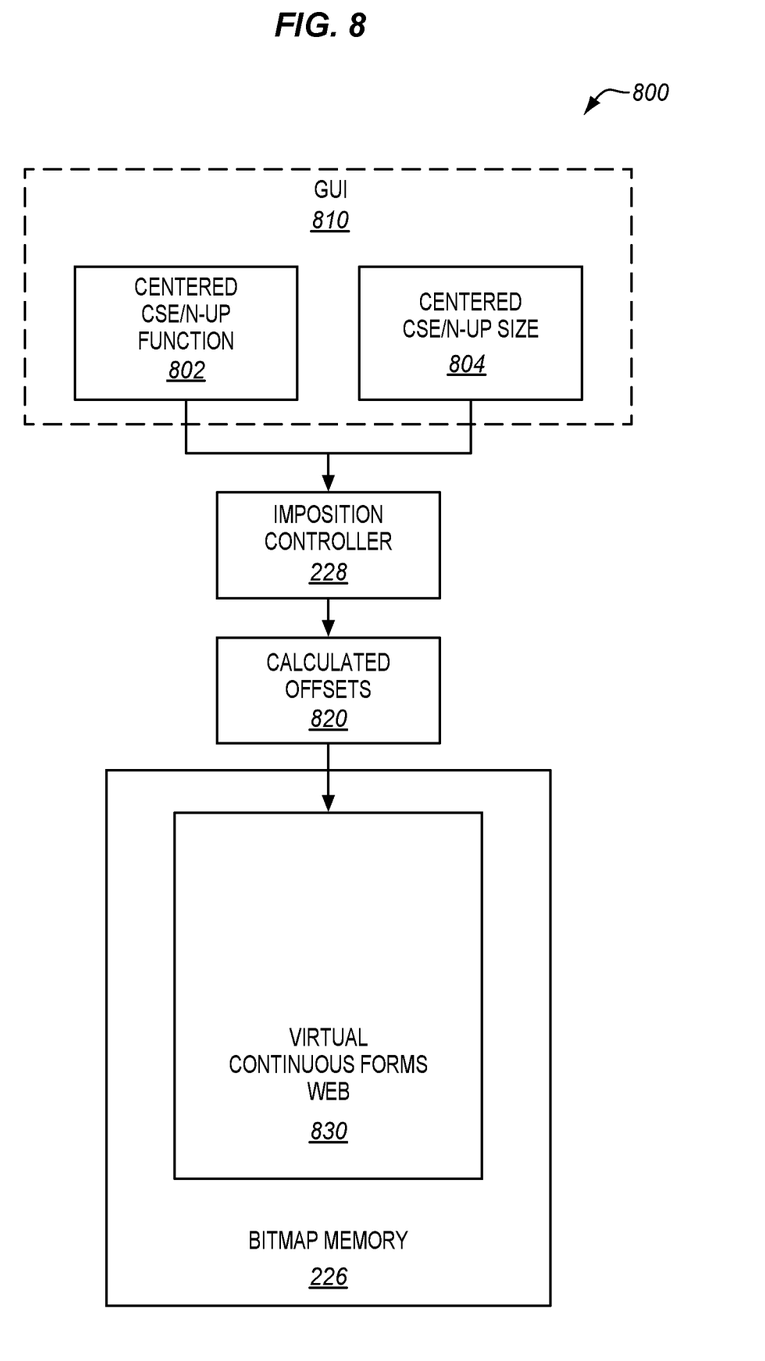
FIG. 8 is a diagram of applying alignment calculations to bitmaps for front-to-back page alignment in an illustrative embodiment.

FIG. 8 is a diagram 800 of applying alignment calculations to bitmaps for front-to-back page alignment in an illustrative embodiment. In particular, the imposition controller 228 receives input of the centered CSE/N-up function 802 toggled on/off, and also input of the centered CSE/N-up size 804. These inputs may be selected or entered via a graphical user interface 810 on the console of a printer. The imposition controller 228 uses the inputs to determine calculated offsets 820 which are applied to a virtual continuous forms web 830 stored in bitmap memory 226. The virtual continuous forms web 830 represents a size of the physical media and forms a basis for instructing print engines to physically mark the web. Thus, the imposition controller 228 is configured to maintain front-to-back page alignment for duplex jobs by changing offset references stored in bitmap memory 226 prior to printing.

Figure 9:
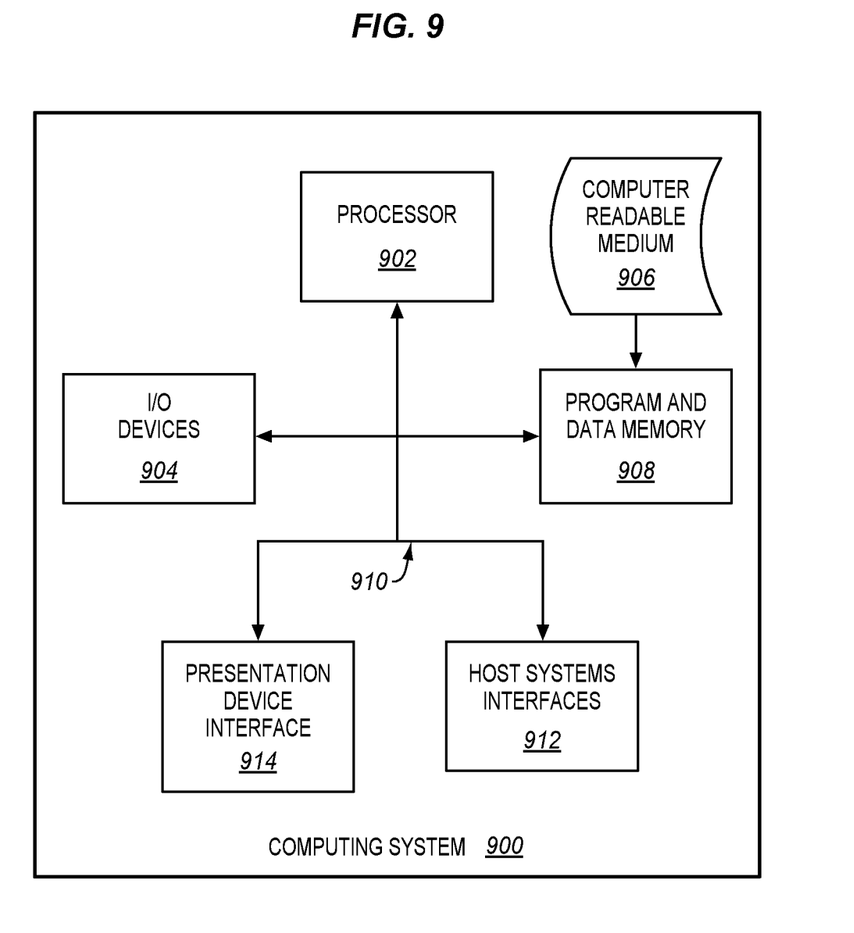
FIG. 9 illustrates a computing system configured to execute a computer readable medium embodying programmed instructions to perform desired functions in an illustrative embodiment.

FIG. 9 illustrates a computing system 900 configured to execute a computer readable medium embodying programmed instructions to perform desired functions in an illustrative embodiment. Computing system 900 is configured to perform the above operations by executing programmed instructions tangibly embodied on computer readable medium 906. In this regard, embodiments can take the form of a computer program accessible via computer-readable medium 906 providing program code for use by a computer or any other instruction execution system. For the purposes of this description, computer readable storage medium 906 can be anything that can contain or store the program for use by the computer.

Computer readable medium 906 can be an electronic, magnetic, optical, electromagnetic, infrared, or semiconductor device. Examples of computer readable storage medium 906 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. Computing system 900, being suitable for storing and/or executing the program code, includes at least one processor 902 coupled to program and data memory 908 through a system bus 910. Program and data memory 908 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 904 (including but not limited to keyboards, displays, pointing devices, etc.) can be coupled either directly or through intervening I/O controllers. Host system interfaces 912 may also be integrated with the system to enable computing system 900 to become coupled to other data processing systems or storage devices through intervening private or public networks. Modems, cable modems, SCSI, Fibre Channel, and Ethernet cards are just a few of the currently available types of network or host interface adapters. Presentation device interface 914 may be integrated with the system to interface to one or more presentation devices, such as printing systems and displays for presentation of presentation data generated by processor 902. Although specific embodiments were described herein, the scope of the inventive concept(s) is not limited to those specific embodiments. The scope of the inventive concept(s) is defined by the following claims and any equivalents thereof.

What is claimed is:

1. An apparatus comprising:
    a host interface configured to receive a print job to be printed on a continuous web of print media in a duplex format with multiple first pages across a front of the web and multiple second pages across a back of the web which correspond with the multiple first pages;
    an imposition controller configured to determine a print region of the print job with respect to a virtual continuous forms representing a size of the web, to determine a size of sheetlet regions for the print region, to map the multiple first pages to the sheetlet regions on a front of the virtual continuous forms, and to map the multiple second pages to the sheetlet regions on a back of the virtual continuous forms,
    the imposition controller configured to apply first offsets to the sheetlet regions on the front of the virtual continuous forms based on operator input, to determine second offsets for the sheetlet regions on the back of the virtual continuous forms based on an additive inverse of the first offsets, and to modify processing of the print job by applying the second offsets to the sheetlet region on the back of the virtual continuous forms to maintain alignment of front pages and back pages across the web.

2. The apparatus of claim 1 wherein:
    the imposition controller is configured to store the virtual continuous forms in memory as a bitmap, and to modify the bitmap to include the second offsets.

3. The apparatus of claim 1 wherein:
    the operator input includes an indication that a centering function is turned on, and further includes a layout size for the print job.

4. The apparatus of claim 1 wherein:
    the print job is a cut-sheet emulation print job.

5. The apparatus of claim 1 wherein:
    the print job is an N-up print job.

6. The apparatus of claim 1 wherein:
    the first offsets comprise offsets for each of a front left sheetlet region and a front right sheetlet region, and
    the second offsets comprise offsets for each of a back left sheetlet region and a back right sheetlet region.

7. A print system comprising:
    the apparatus of claim 1; and
    a print engine to mark the web.

8. A method of aligning multiple pages front-to-back for printing, the method comprising:
    receiving a print job to be printed on a continuous web of print media in a duplex format with multiple first pages across a front of the web and multiple second pages across a back of the web which correspond with the multiple first pages;
    determining a print region of the print job with respect to a virtual continuous forms representing a size of the web;
    determining a size of sheetlet regions for the print region;
    mapping the multiple first pages to the sheetlet regions on a front of the virtual continuous forms;
    mapping the multiple second pages to the sheetlet regions on a back of the virtual continuous forms;
    applying first offsets to the sheetlet regions on the front of the virtual continuous forms based on operator input;
    determining second offsets for the sheetlet regions on the back of the virtual continuous forms based on an additive inverse of the first offsets; and
    modifying processing of the print job by applying the second offsets to the sheetlet region on the back of the virtual continuous forms to maintain alignment of front pages and back pages across the web.

9. The method of claim 8 further comprising:
    storing the virtual continuous forms in memory as a bitmap; and
    modifying the bitmap to include the second offset.

10. The method of claim 8 wherein:
    the operator input includes an indication that a centering function is turned on, and further includes a layout size for the print job.

11. The method of claim 8 further comprising:
    the print job is one of an N-up print job and a cut-sheet emulation print job.

12. The method of claim 8 wherein:
    the first offsets comprise offsets for each of a front left sheetlet region and a front right sheetlet region, and
    the second offsets comprise offsets for each of a back left sheetlet region and a back right sheetlet region.

13. The method of claim 12 wherein:
    the continuous web of print media comprises tractorless paper.

14. A non-transitory computer readable medium embodying programmed instructions, which, when executed by a processor, are operable for performing a method comprising:
    receiving a print job to be printed on a continuous web of print media in a duplex format with multiple first pages across a front of the web and multiple second pages across a back of the web which correspond with the multiple first pages;
    determining a print region of the print job with respect to a virtual continuous forms representing a size of the web;
    determining a size of sheetlet regions for the print region;
    mapping the multiple first pages to the sheetlet regions on a front of the virtual continuous forms;
    mapping the multiple second pages to the sheetlet regions on a back of the virtual continuous forms;
    applying first offsets to the sheetlet regions on the front of the virtual continuous forms based on operator input;
    determining second offsets for the sheetlet regions on the back of the virtual continuous forms based on an additive inverse of the first offsets; and
    modifying processing of the print job by applying the second offsets to the sheetlet region on the back of the virtual continuous forms to maintain alignment of front pages and back pages across the web.

15. The medium of claim 14, wherein the method further comprises:
   storing the virtual continuous forms in memory as a bitmap; and
   modifying the bitmap to include the second offset.

16. The medium of claim 14, wherein:
   the operator input includes an indication that a centering function is turned on, and further includes a layout size for the print job.

17. The medium of claim 14, wherein:
   the print job is a cut-sheet emulation print job.

18. The medium of claim 14, wherein:
   the print job is an N-up print job.

19. The medium of claim 14, wherein:
   the first offsets comprise offsets for each of a front left sheetlet region and a front right sheetlet region, and
   the second offsets comprise offsets for each of a back left sheetlet region and a back right sheetlet region.

20. The medium of claim 19, wherein:
   the continuous web of print media comprises tractorless paper.

\* \* \* \* \*